US008025115B2

(12) United States Patent
King et al.

(10) Patent No.: US 8,025,115 B2
(45) Date of Patent: Sep. 27, 2011

(54) HYBRID VEHICLE POWER CONTROL SYSTEMS AND METHODS

(75) Inventors: Robert Dean King, Schenectady, NY (US); Dongwoo Song, Lantham, NY (US); Lembit Salasoo, Schenectady, NY (US); Ajith Kuttannair Kumar, Erie, PA (US); Henry Todd Young, North East, PA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/250,060

(22) Filed: Jun. 2, 2003

(65) Prior Publication Data

US 2004/0238243 A1     Dec. 2, 2004

(51) Int. Cl.
*B60L 7/02*     (2006.01)
(52) U.S. Cl. ............. 180/65.275; 180/65.285; 180/65.1; 701/22
(58) Field of Classification Search ................. 180/65.1, 180/65.2, 65.3, 65.4; 701/22; 105/35; 318/86, 318/87, 106
See application file for complete search history.

(56) References Cited

U.S. PATENT DOCUMENTS

| | | | | |
|---|---|---|---|---|
| 3,735,220 A * | 5/1973 | Renner et al. | | 318/139 |
| 3,743,901 A * | 7/1973 | Johnson | | 318/87 |
| 3,823,367 A * | 7/1974 | Kaye et al. | | 324/426 |
| 4,009,431 A * | 2/1977 | Johnson | | 322/7 |
| 4,090,114 A * | 5/1978 | Thompson | | 318/139 |
| 4,093,900 A * | 6/1978 | Plunkett | | 318/370 |
| 5,373,195 A * | 12/1994 | De Doncker et al. | | 307/45 |
| 5,430,362 A * | 7/1995 | Carr et al. | | 318/779 |
| 5,710,699 A * | 1/1998 | King et al. | | 363/132 |
| 6,597,072 B2 * | 7/2003 | Yamazaki | | 307/9.1 |
| 6,683,389 B2 * | 1/2004 | Geis | | 290/40 C |
| 6,686,719 B2 * | 2/2004 | Cochoy et al. | | 318/801 |
| 2003/0048006 A1 * | 3/2003 | Shelter et al. | | 307/64 |

* cited by examiner

*Primary Examiner* — Frank Vanaman
(74) *Attorney, Agent, or Firm* — Marie-Claire Maple

(57) ABSTRACT

A method for controlling a power system of a hybrid vehicle includes determining, during a motoring mode of operation, a desired operating voltage of a direct current (DC) bus included in the power system at a given speed. The desired operating voltage is based on a minimum operating voltage at the given speed and a maximum operating voltage at the given speed, wherein an energy storage element parameter is used establishing the minimum operating voltage.

9 Claims, 11 Drawing Sheets

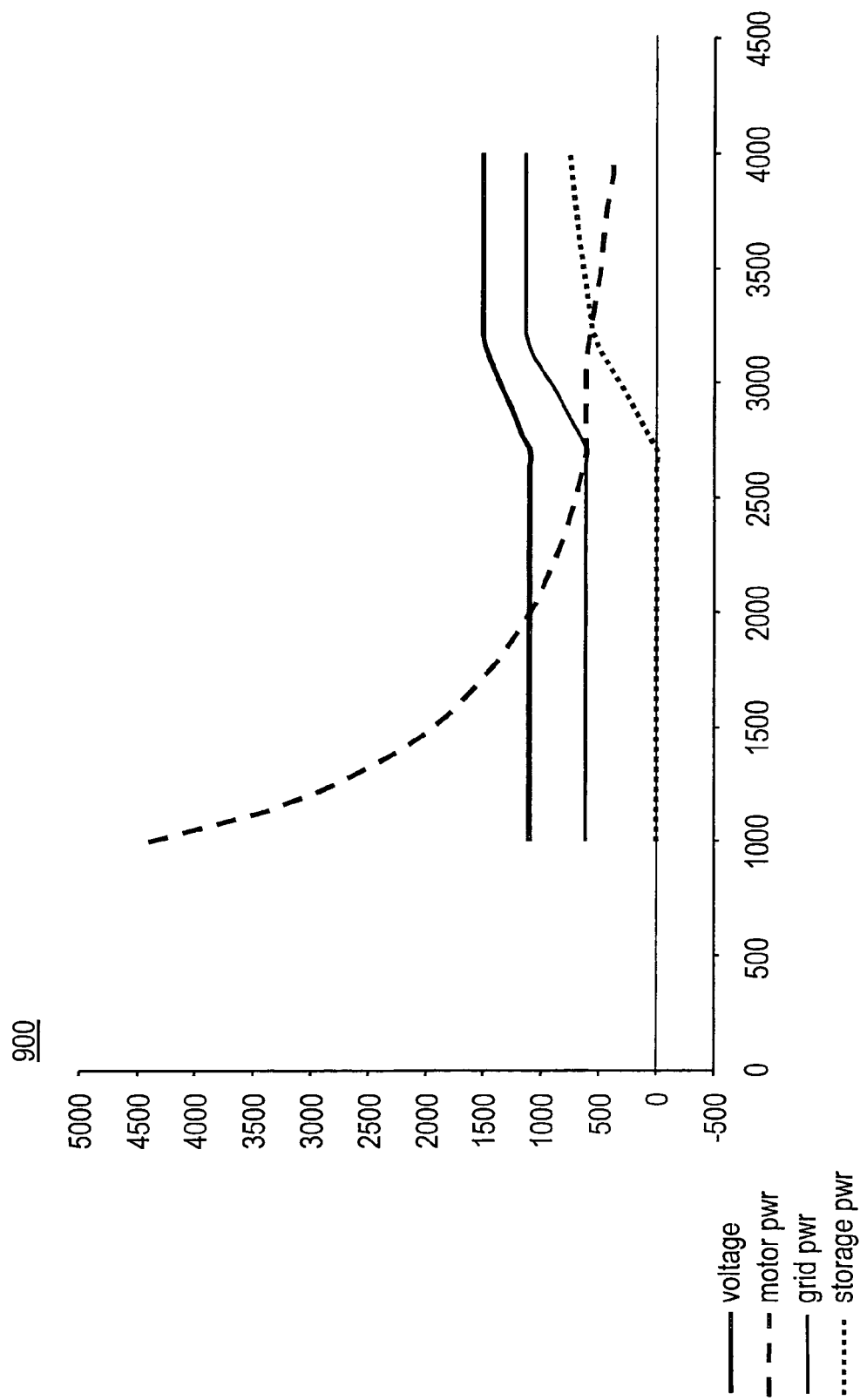

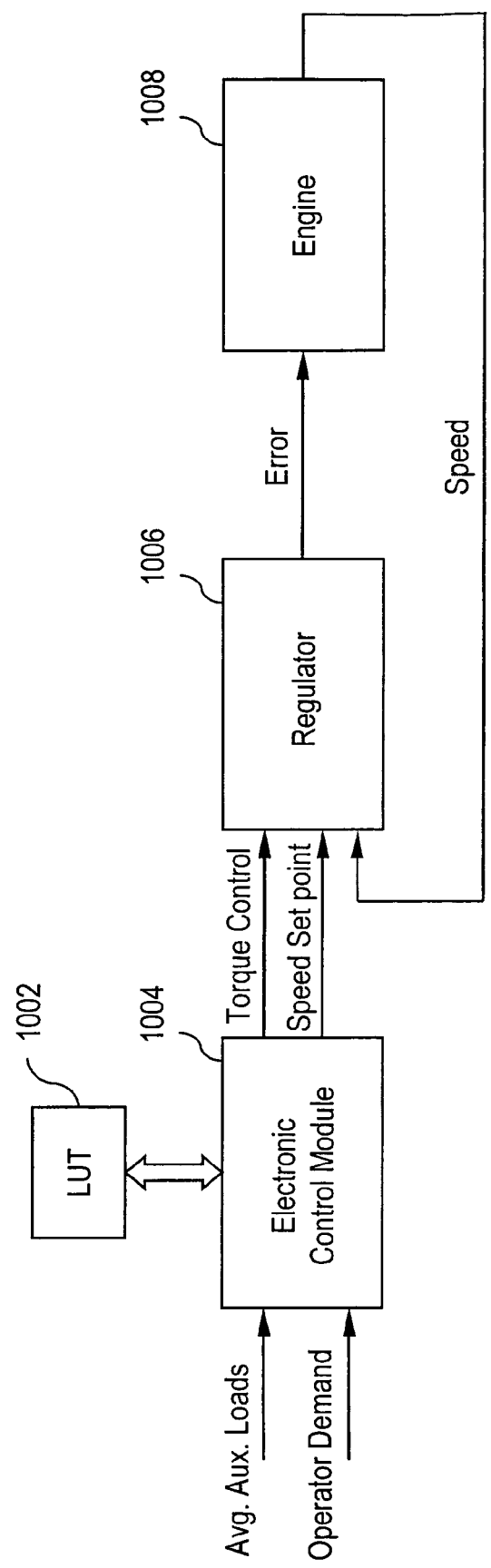

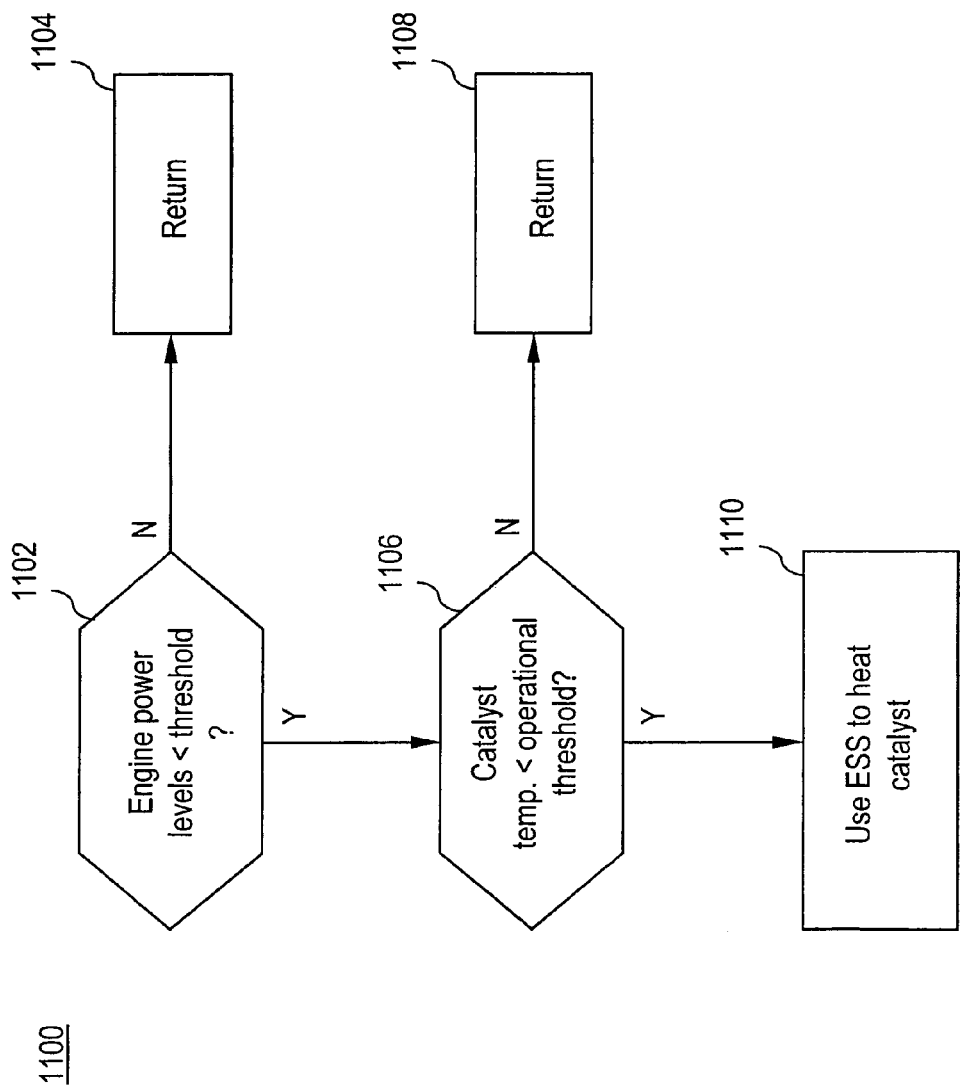

HYBRID VEHICLE POWER CONTROL SYSTEMS AND METHODS

BACKGROUND OF THE INVENTION

The present disclosure relates generally to hybrid vehicles such as off-highway vehicles (OHV), locomotives, trolley systems, and the like, and, more particularly, to hybrid vehicle power control systems and methods.

Off-highway (OHV) vehicles, including trolley connected OHVs and other large traction vehicles, are commonly powered by electric traction motors coupled in driving relationship to one or more axles or motor-wheel sets of the vehicle. In the motoring or traction mode of operation, the traction motors are supplied with electric current from a controllable source of electric power (e.g., an engine-driven traction alternator/rectifier/inverter combination or, alternatively, a direct current drive source including a dc motor without an inverter) and apply torque to the vehicle wheels which exert tangential force or tractive effort on the surface on which the vehicle is traveling (e.g., a haulage track or road), thereby propelling the vehicle in a desired direction along the right of way.

Conversely, in an electrical (i.e., dynamic) braking mode of operation, the same motors serve as axle-driven electrical generators. Torque is applied to the motor shafts by their respectively associated axle-wheel sets which then exert braking effort on the surface, thereby retarding or slowing the vehicle's progress. Because there is no suitable storage medium for the resulting generated electrical energy in a conventional off-highway vehicle or trolley, an electrically resistive grid (known as a dynamic braking grid or load box) is used to convert the electrical energy into heat energy, which is then vented to the atmosphere.

In contrast, hybrid OHVs and hybrid trolley OHVs have the capability of storing the generated dynamic braking energy in a suitable storage element(s) such as batteries, flywheels, ultracapacitors and the like. This stored energy may then be used for traction and/or auxiliary systems in the OHV, thereby improving fuel efficiency. Because these associated power storage elements are now added to the power system in an OHV, it would be desirable to obtain further secondary benefits therefrom such as, for example, reducing the stress on power components, improving the fuel efficiency by optimizing the system operating voltages, and attaining better dynamic operation of the vehicle, among other aspects.

BRIEF DESCRIPTION OF THE INVENTION

The above discussed and other drawbacks and deficiencies of the prior art are overcome or alleviated by a method for controlling a power system of a hybrid vehicle. In an exemplary embodiment, the method includes determining, during a motoring mode of operation, a desired operating voltage of a direct current (DC) bus included in the power system at a given speed. The desired operating voltage is based on a minimum operating voltage at the given speed and a maximum operating voltage at the given speed, wherein an energy storage element parameter is used establishing the minimum operating voltage.

In another aspect, a method for controlling a power system of a hybrid vehicle includes, during a dynamic braking mode of operation, configuring the power system so as to allow a storage battery to receive dynamic braking power outputted by a traction motor of the system, the battery receiving the dynamic braking power up to a first threshold level. For dynamic braking power levels in excess of the first threshold level, one or more resistive grid elements are coupled in the power system to dissipate the excess power levels.

In still another aspect, a method for controlling a power system of a hybrid vehicle includes determining, for a first bus voltage, a point of operation at which a power generation capability of traction motor of the power system is equal to a power dissipation capability of one or more resistive grid elements in the power system. At about the point of operation, the first bus voltage is increased to a second bus voltage.

In still another aspect, a method for controlling engine speed of a hybrid vehicle includes determining a power demand from a traction drive of the vehicle, determining an average of auxiliary power loads of the vehicle, and determining an engine control speed set point. The engine control speed set point produces a desired total engine power output and a desired specific fuel consumption. The desired total output corresponds to the power demand from the traction drive plus the average of auxiliary power loads.

In still another aspect, a power control system for a hybrid vehicle includes an electronic control module (ECM) configured for receiving a signal representative of a power demand from a traction drive of the vehicle. The ECM is further configured for receiving a signal representative of an average of auxiliary power loads of the vehicle. The ECM is further configured for generating an engine control speed set point, the engine control speed set point producing a desired engine speed, a desired torque, a desired total power output and a desired specific fuel consumption. The desired total output corresponds to the power demand from the traction drive plus the average of auxiliary power loads.

In still another aspect, a method for controlling catalyst temperature of an exhaust system for a hybrid vehicle includes determining a mode of operation in which engine output power levels are below a threshold value, and using stored energy within an energy storage system of the vehicle to heat a vehicle exhaust catalyst whenever the engine output levels are below a threshold value.

BRIEF DESCRIPTION OF THE DRAWINGS

Referring to the exemplary drawings wherein like elements are numbered alike in the several Figures:

FIG. 9 is a speed versus horsepower/voltage curve for a hybrid OHV without energy storage capability, illustrating a further aspect of the present invention;

FIG. 10 is a block diagram illustrating a method for closed loop power control of a hybrid OHV engine, in accordance with a further aspect of the present invention; and FIG. 11 is a flow diagram illustrating the use of captured electrical energy in an OHV for heating an exhaust system catalyst during periods of low power demand, in accordance with a further aspect of the present invention.

DETAILED DESCRIPTION OF THE INVENTION

Figure 1:
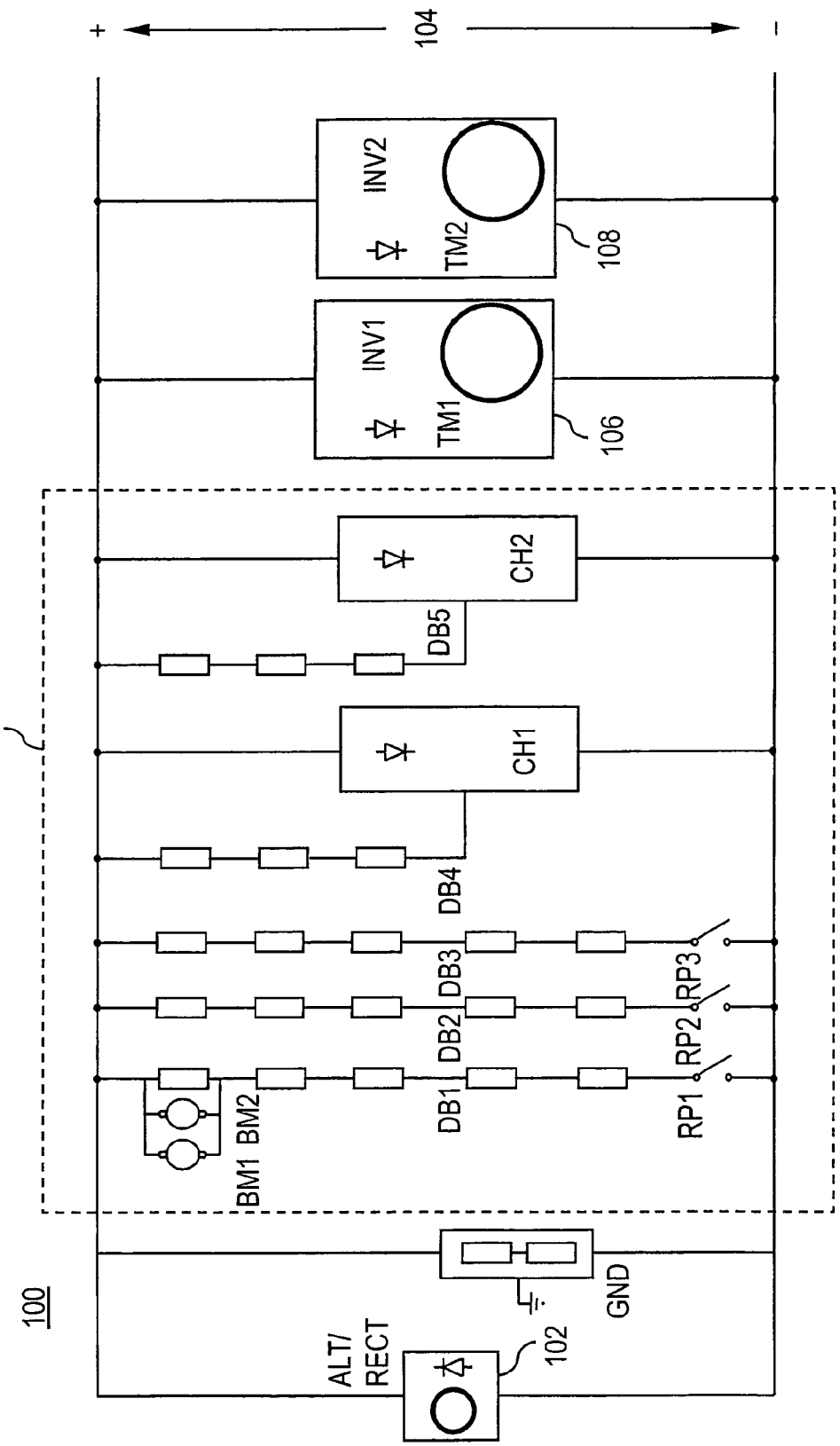
FIG. 1 is a schematic diagram of a conventional locomotive or off highway vehicle (OHV) power system.

Referring to FIG. 1, there is shown a schematic diagram of a conventional locomotive or off highway vehicle (OHV) power system 100. Although the particular figures and embodiments described hereinafter are presented in the context of an OHV power system, it should be appreciated that the principles thereof are equally applicable to other types of large traction vehicles featuring dynamic/regenerative braking.

It is generally known in the art to employ at least two power supply systems in such locomotives. A first system includes the prime mover power system that provides power to the traction motors, while a second system provides power for so-called auxiliary electrical systems (or simply auxiliaries). A diesel engine (not shown) drives the prime mover power source 102 (e.g., an alternator and rectifier), as well as any auxiliary alternators (not shown) used to power various auxiliary electrical subsystems such as, for example, lighting, air conditioning/heating, blower drives, radiator fan drives, control battery chargers, field exciters, and the like. The auxiliary power system may also receive power from a separate axle driven generator. Auxiliary power may also be derived from the traction alternator of prime mover power source 102.

The output of prime mover power source 102 is connected to a DC bus 104, which supplies DC power to traction motor subsystems 106 and 108. The DC bus 104 may also be referred to as a traction bus because it carries the power used by the traction motor subsystems. Although there are only two traction motor subsystems illustrated in FIG. 1, it will be appreciated that additional traction motor subsystems may be present, depending on the size and type of OHV. Each traction motor subsystem 106, 108 includes an inverter (INV1, INV2, respectively) and a corresponding traction motor (TM1, TM2, respectively).

During braking, the power generated by the traction motors is dissipated through a dynamic braking grid subsystem 110. As further illustrated in FIG. 1, a typical prior art dynamic braking grid includes a plurality of contactors (e.g., RP1-RP3) for switching a plurality of power resistive elements between the positive and negative rails of the DC bus 104. Each vertical grouping of resistors may be referred to as a string (e.g., DB1-DB3). One or more power grid cooling blowers (e.g., BM1 and BM2) are normally used to remove heat generated by the resistors due to dynamic braking. In addition, chopper circuits CH1 and CH2 allow for finer control of power dissipation through strings DB4 and DB5. Additional chopper circuits could also be used to control transient power. The number of contactors and choppers could be reduced for based on the power capability and the amount of retarding power to be dissipated.

Figure 2:
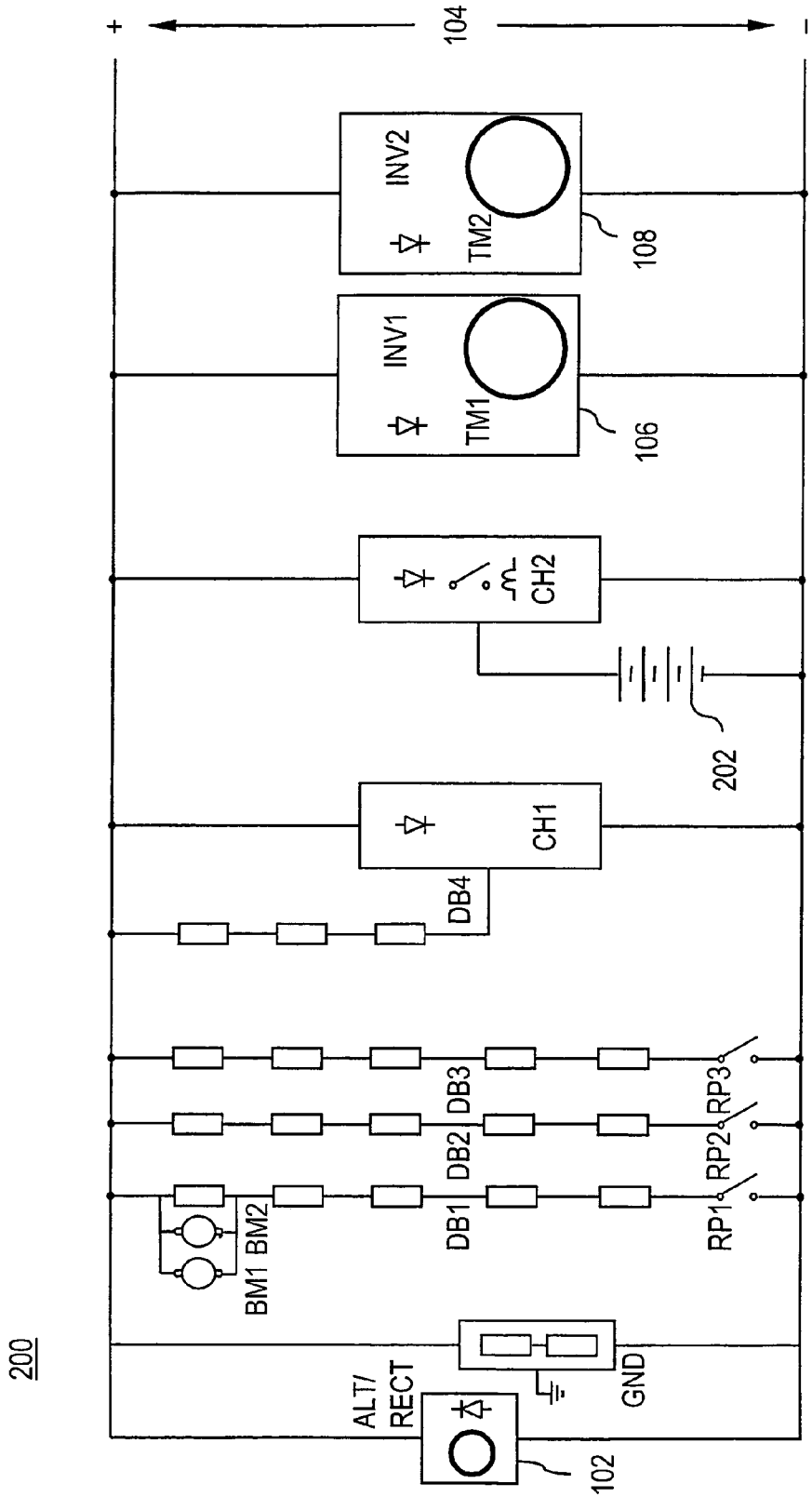
FIG. 2 is a schematic diagram of a hybrid OHV power system having an energy capture and storage medium suitable for use in connection with embodiments of the present invention.

As indicated previously, prior art OHVs (and locomotives) typically waste the energy generated from dynamic braking. Thus, FIG. 2 is a schematic diagram of a hybrid OHV power system 200 having an energy capture and storage medium suitable for use in connection with embodiments of the systems and methods described herein. In contrast to the conventional system 100 of FIG. 1, system 200 further includes a storage battery 202, although those skilled in the art will appreciate that other types of storage elements may be implemented. These may include, for example, flywheel devices, capacitor storage devices (including ultra-capacitors) and additional battery storages (not shown) that can also be connected across the DC bus 104 and controlled using choppers and/or converters and the like. In the embodiment illustrated, chopper device CH2 is used in conjunction with storage battery 202 to allow a greater degree of variation between the DC bus voltage and the voltage rating of the storage battery 202. As is also described in greater detail hereinafter, chopper CH2 is further configured to selectively couple the positive terminal of storage battery 202 so as to allow the battery to store energy from the DC bus 104 or supply energy thereto. The number of dynamic brake grid contactors and number of choppers controlling the dynamic brake grids can also be made dependent on the power ratings.

In operation, the battery 202 (and/or any other energy storage elements) is charged directly during dynamic braking. It will be recalled that, during dynamic braking, one or more of the traction motor subsystems (e.g., TM1, TM2 operate as generators and supply dynamic braking electric power, which is carried on DC bus 104. Thus, all, a portion or none of the dynamic braking electric power carried on DC bus 104 may be stored in the storage battery 202, depending on the power available on the bus and the amount of power that can be stored. When the engine is motoring, the battery 202 (and any other optional storage element) is permitted to discharge and provide energy to DC bus 104 that can be used to assist in driving the traction motors.

Figure 3:
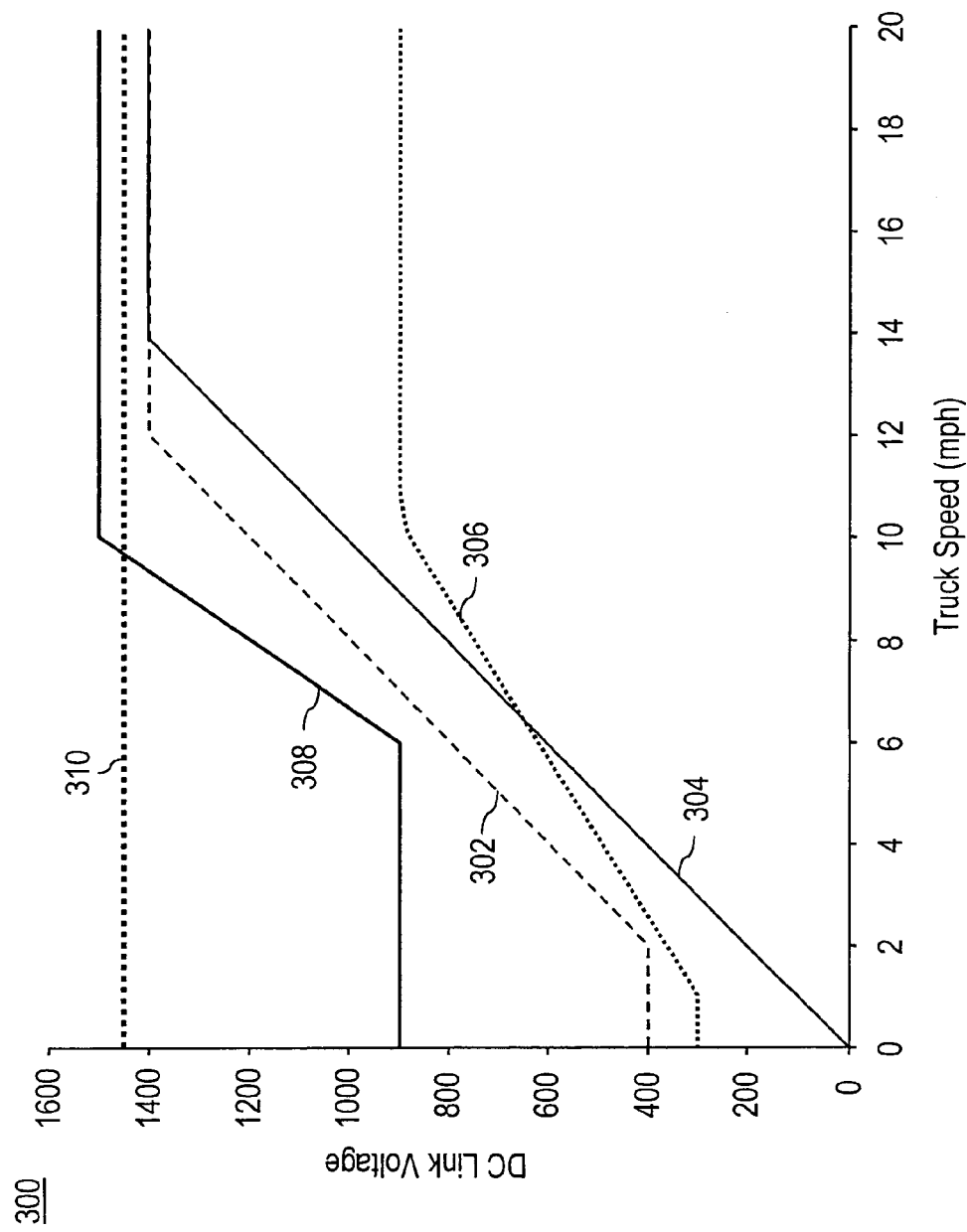
FIG. 3 is a graph illustrating the DC link voltage control of a conventional OHV as a function of vehicle speed during a motoring mode of operation.

FIG. 3 is a graph 300 illustrating the DC link voltage control of a conventional OHV as a function of vehicle speed during a motoring mode of operation. An "optimum" voltage curve 302 versus speed is bounded by a minimum value and a maximum value, which also depend upon the vehicle speed. In particular, a minimum DC link voltage value for a given speed is based upon the traction motor minimum operating voltage (curve 304) and/or the inverter minimum operating voltage (curve 306). There may also be other criteria for selecting a minimum DC link voltage (such as transient response, alternator characteristics, engine speed, etc.). Furthermore, a maximum DC link voltage value is based upon the inverter maximum operating voltage (curve 308) and/or the alternator maximum operating voltage (curve 310). Again, as is the case with the minimum link voltage, other considerations may also determine the maximum voltage. Thus, in the example illustrated, at vehicle speeds between 0 and about 6 mph, the minimum and maximum DC link voltage is dictated by the minimum/maximum inverter voltage. The optimum dc link voltage curve depends on the current state of the various components since some of the losses are dependent on characteristics such as resistances, which in turn depend on the temperature of the devices.

However, at speeds of about 7 mph or more, it can be seen that the traction motor minimum voltage exceeds the minimum inverter voltage, and thus the traction motor minimum voltage now dictates the minimum DC link voltage. In addition, once the vehicle speed exceeds about 9 mph, the alternator maximum voltage now becomes the maximum DC link voltage. The particular value of the DC link voltage at a given speed is determined through an optimization function in the system controller, as bounded by the minimum/maximum ranges applicable at that speed.

The addition of the energy storage system in a hybrid OHV allows for additional DC link flexibility (and constraints), depending upon the particular power circuits selected. For example, the presence of the battery results in an additional minimum voltage to be considered, especially in those power systems employing a conventional DC to DC converter. In other words, in accordance with another aspect of the present invention, the selected DC link voltage is also a function of the output energy and/or power of the energy storage element (e.g., the battery voltage).

Figure 4:
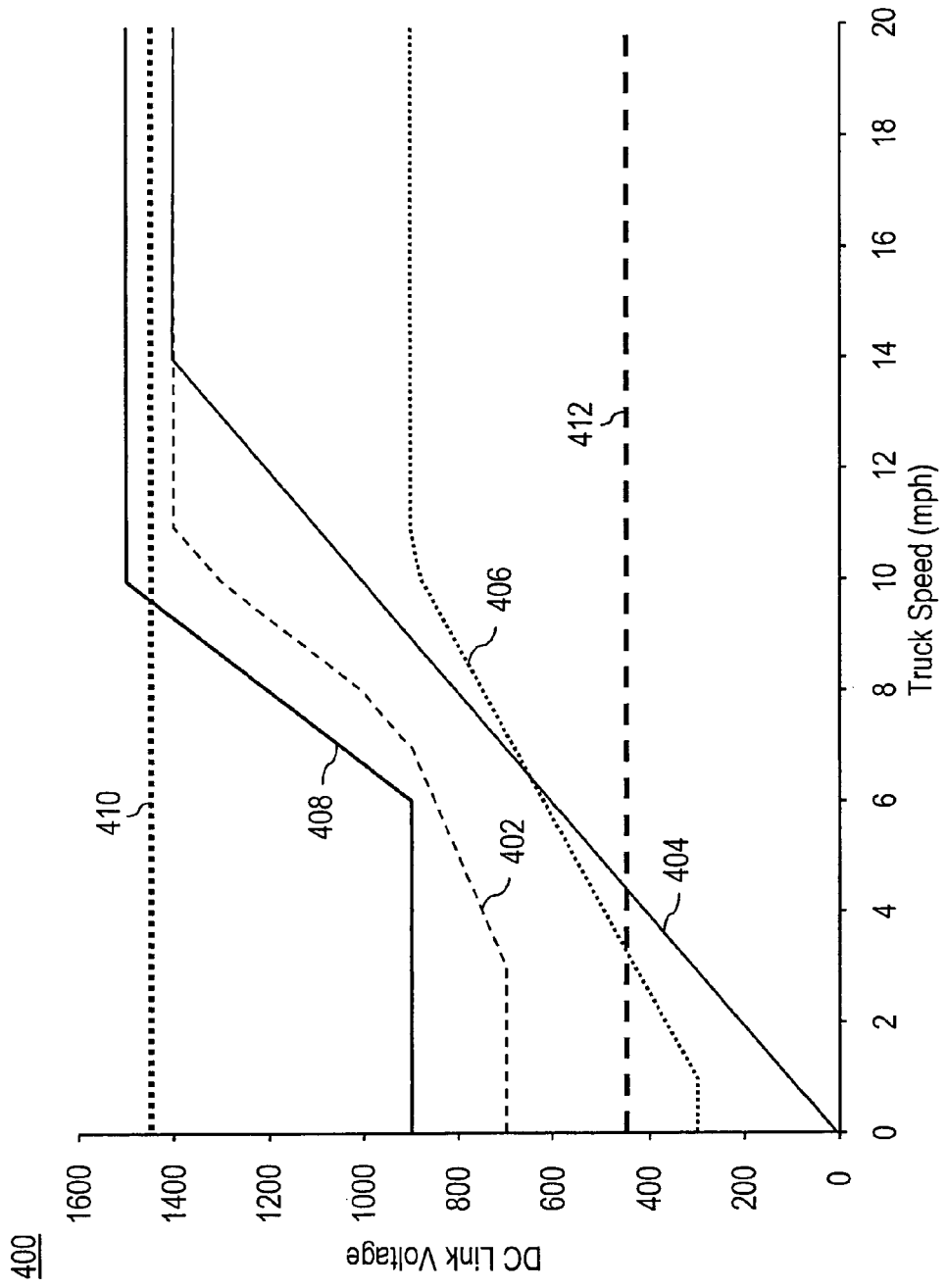
FIG. 4 is a graph illustrating a method for DC link voltage control of a hybrid OHV as a function of vehicle speed during a motoring mode of operation, in accordance with an embodiment of the invention.

Another limitation on this voltage results from the chopper switching frequency and ripple current. The ripple current of the battery depends on the dc link voltage, battery voltage, the inductance and the chopping frequency. In a single-phase chopper, as the dc link voltage increases above the battery voltage, the ripple current increases. Similarly, in a two-phase chopper, the ripple current increases initially and then comes down to zero at twice the battery voltage. Above this voltage the ripple current continues to increase. The efficiency of the DC to DC converter not only depends on the ripple current, but also on the switching and conduction losses (such as in the semiconductors like insulated gated bipolar transistors (IGBTs), freewheeling diodes and snubber circuit components), which also depends on the dc link voltage. Accordingly, an optimization function of the hybrid OHV system also takes into account the ripple current and efficiency of the various components. FIG. 4 illustrates the details.

As shown in the graph 400 of FIG. 4, curve 412 (a constant) reflects a minimum storage battery voltage. For purposes of illustration, curves 304, 306, 308 and 310 in FIG. 3 have been renumbered in FIG. 4 as curves 404, 406, 408 and 410, respectively. It should be noted that this point that the specific values of the curves shown in FIG. 4 are exemplary in nature, and should not be construed as limiting in any sense. In addition, while curve 412 represents a minimum storage battery voltage, it could also represent a minimum operating voltage for other types of storage elements. In general, this voltage may not be a function of vehicle speed, but rather a function of an energy storage system parameter (e.g., capacitor voltage, flywheel speed, battery state of charge/temperature, etc.). Thus, as can be seen from FIG. 4, at vehicle speeds up to about 3 mph, it is the minimum battery voltage that now establishes the minimum DC link voltage. It will further be noted that at speeds between about 3 to 7 mph (where the inverter minimum voltage establishes the minimum DC link voltage) and between about 7 to 11 mph (where the traction motor minimum voltage establish the minimum DC link voltage), the optimized DC link voltage curve 402 typically will be different from the optimized curve 302 of FIG. 3, despite having the same minimum/maximum boundaries in that speed range. Again, this is due to the optimization function, which takes into account the energy storage devices and the power and efficiency of these devices.

Since some of the power is supplied by the energy storage device(s), the alternator/inverter may see different load conditions. For example, if the inverter load is the same, then the alternator/engine needs to supply less power since the energy storage device will be supplying some power. In another case, if the alternator power is the same, then more power is available to the inverter and traction motor. The optimized voltage will also depend on the current state of various components including the storage device. For example, the internal resistance of batteries (which determines the losses and hence the efficiency) depends on the state of charge of the batteries and the temperature of the batteries.

Figure 5:
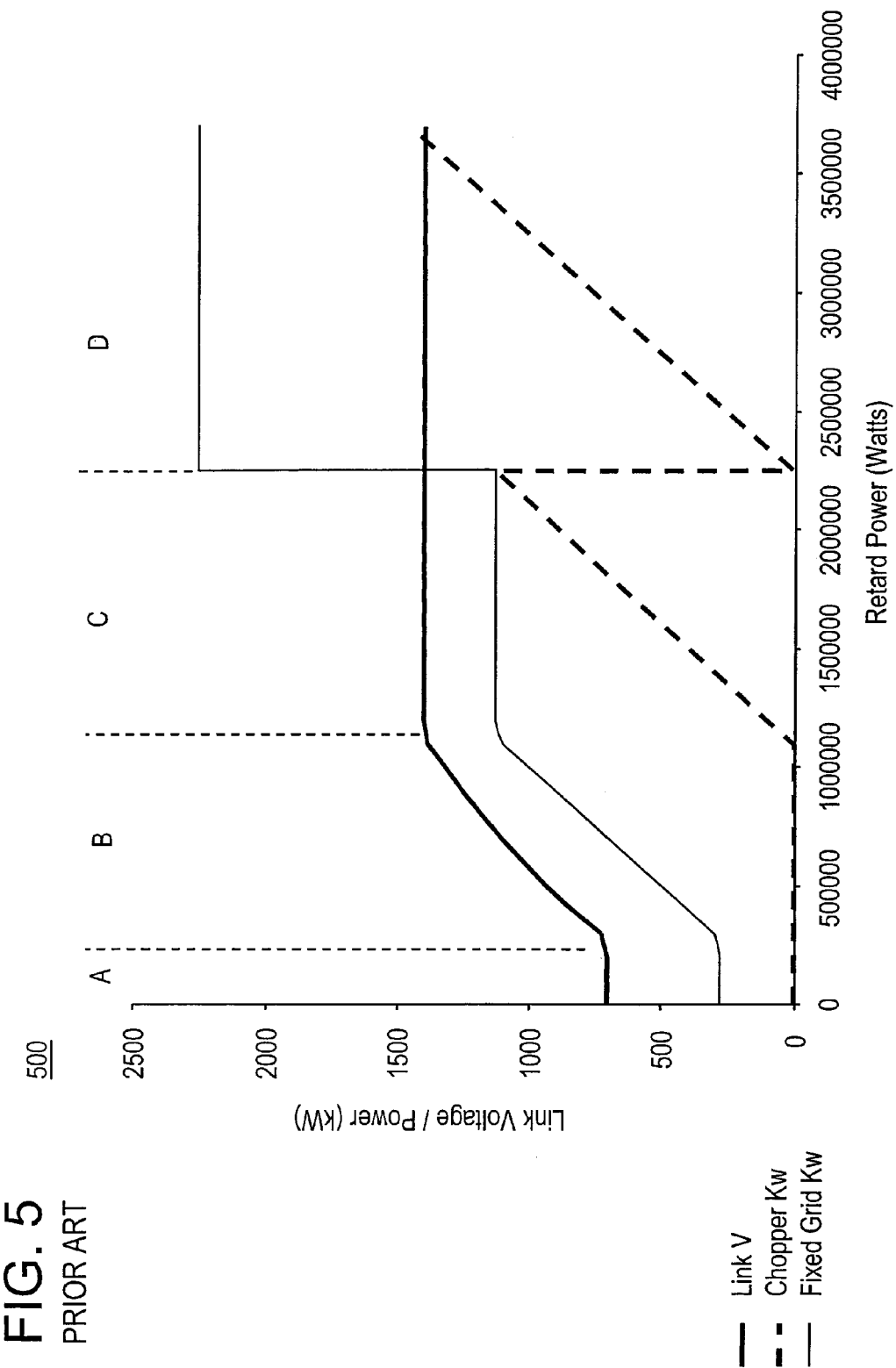
FIG. 5 illustrates a graphical display of an existing implementation of dynamic braking contactor staging control.

Additional benefits may also be realized for the hybrid OHV power system during the dynamic braking mode of operation. For instance, in an existing non-hybrid OHV, air cooled resistor elements are used to dissipate power generated from the traction motors. This power is provided by the vehicle inertia/grade, thereby providing negative torque to slow down the vehicle. The air to cool these resistors is in turn typically provided by a DC blower powered directly from the grids themselves. The specific amount of power dissipated through the resistors is generally controlled by the opening/closing of contactors and/or the activation of chopper devices. In a conventional OHV power system, the contactor associated with the string of resistors powering the blower motor must be closed before any other power is dissipated, including the chopper devices. FIG. 5 shows a graphical illustration 500 of the voltage and power flow and the contactor/chopper controls in this conventional system. In particular, the graph 500 of FIG. 5 breaks down the distribution of power dissipated by the conventional system components as the total braking power increases. It will be noted that the units included on the vertical axis are used to represent both "kilowatts" (kw) for the amount of power dissipated, as well as "volts" since the resulting DC link voltage as a function of the dynamic braking scheme is also illustrated. The particular units shown in FIG. 5 are exemplary in nature.

For illustration purposes, the graph 500 has been divided into four regions of operation (labeled A-D). In the first region of operation (A), the power supplied from the traction motors is augmented by power from the engine to keep the voltage at a minimum desired level. The power consumed by the fixed grids is a function of the dc link voltage. As the power from the traction motors increases, the power consumed from the engine decreases until all of the power dissipated by the grids is supplied by the traction motor. Further power increases from about 250 kw to about 1200 kw will cause an increase dc link voltage, as seen in region of operation B. In region C, additional power increases (from about 1200 kw to about 2250 kw) are dissipated by the chopper grids while keeping the dc link voltage constant. Once the chopper grid power increases beyond a certain point (e.g., about 2250 kw), the next resistive grid is turned on and the amount of power dissipated by chopper grid is immediately reduced. This is reflected by the transition between regions C and D. Any further increases in dynamic braking power thereafter are consumed by the chopper grids.

In contrast, in a hybrid OHV, the initial power to be dissipated may be directed to the battery. As such, the resistive grid contactor need only be closed whenever the dynamic braking power level exceeds the storage capability of the battery. This scheme has at least two advantages. First, the amount of cycling of the contactors and startups of the grid blower motor is reduced, since those components are only engaged when certain threshold level of dynamic braking energy is to be dissipated. Second, the retarding torque is initiated quicker in the hybrid vehicle since the storage battery system can receive power instantaneously whereas a contactor requires about 500 milliseconds to close, thus delaying the start of generating retarding power.

Figure 6:
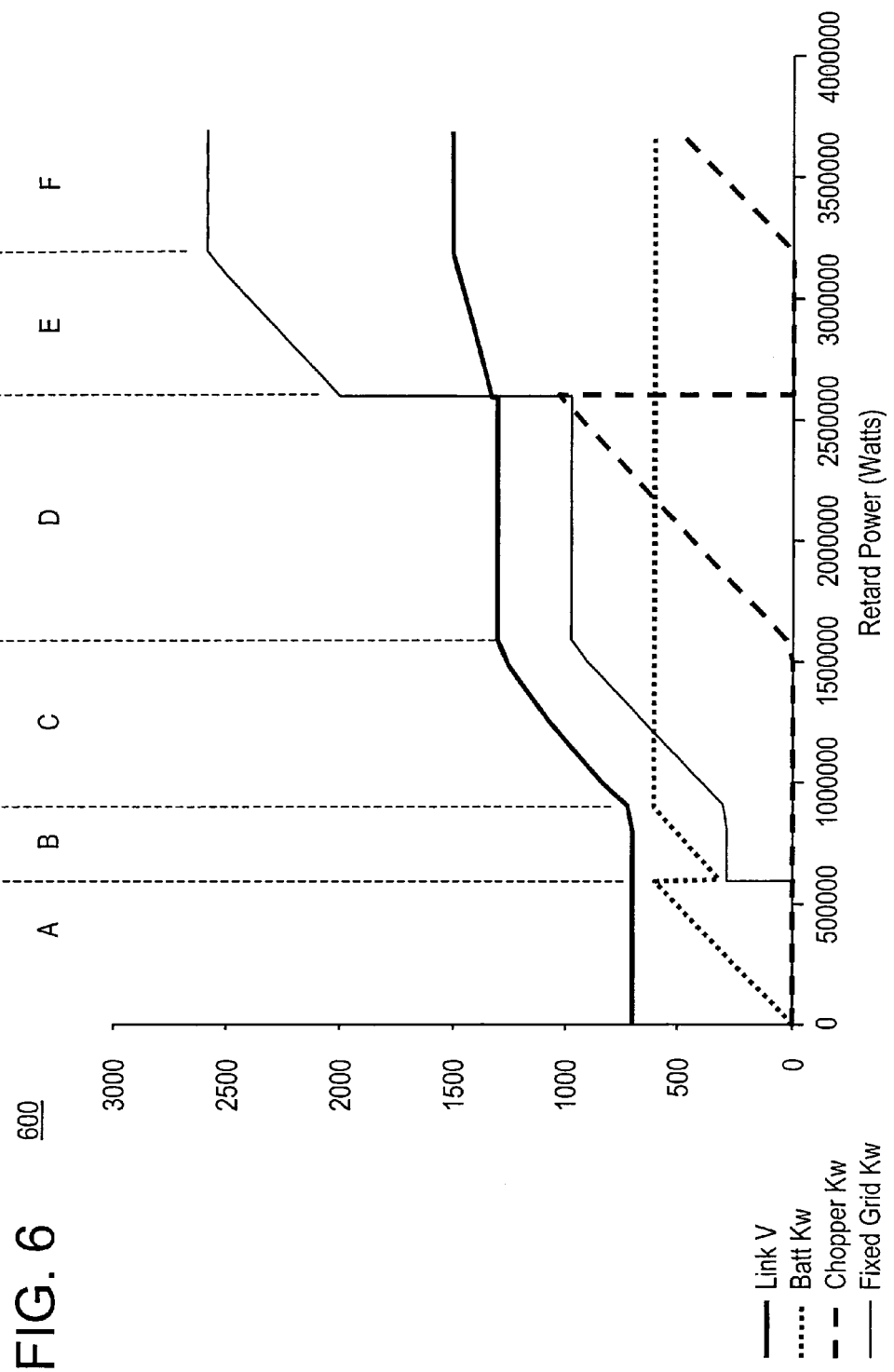
FIG. 6 illustrates a graphical display of one possible embodiment for implementing dynamic braking contactor staging control, in accordance with a further aspect of the present invention.

FIG. 6 illustrates a graphical display 600 of one possible embodiment for implementing dynamic braking contactor staging control, in accordance with a further aspect of the present invention. In particular, the graph 600 of FIG. 6 breaks down the distribution of power dissipated by the various system components as the total braking power increases. Again, it will be noted that the units included on the vertical axis are used to represent both "kilowatts" (kw) for the amount of power dissipated, as well as "volts" since the resulting DC link voltage as a function of the dynamic braking scheme is also illustrated. As was the case for the conventional dynamic braking scheme, the particular units shown in FIG. 6 are exemplary in nature.

For purposes of analysis, the graph 600 in FIG. 6 may be parsed into six regions of operation (labeled A-F). In the first region (A), wherein the braking power to be dissipated ranges from about 0 to about 600 kw, the storage battery 202 is used to store the entire amount of the dissipated power, as indicated previously. Of course, it is assumed for purposes of this example that the battery 202 is not fully charged and can dissipate power. In this region, the DC bus 104 (link) voltage remains constant at about 700 volts. Then, in the next region (B), wherein the braking power to be dissipated ranges from about 600 kw to about 900 kw, a first resistive grid (e.g., DB1 in FIG. 2) is activated such that the first grid immediately serves to dissipate about 300 kw. At the same time, the amount of power received by the battery drops to about 300 kw, and then gradually increases again to its capacity of about 600 kw. Because the power dissipated by the first resistor grid DB1 remains constant in this region, the DC link voltage therefore remains relatively constant at about 700 volts.

However, once the braking power exceeds about 900 kw, the power dissipated by the first resistive grid DB1 begins to exceed 300 kw, since the battery cannot dissipate any additional power beyond 600 kw. Thus as shown in the third region (C), wherein the braking power to be dissipated ranges from about 900 kw to about 1500 kw, the first resistive grid is forced to dissipate power ranging from about 300 kw to about 900 kw (with the battery continuing to dissipate its maximum 600 kw). As a result, it will further be noted in region C that the DC link voltage is now increased as the first resistive grid dissipates power in excess of 300 kw.

For dynamic braking loads between about 1500 kw to about 2600 kw, the graph moves into the fourth region (D), in which the resistive grid DB4 associated with chopper device CH1 is engaged to dissipate approximately an additional 1100 kw. Since the chopper CH1 is selected to handle the increased power in this region, the resistive grid dissipated power through DB1 (and battery power) remains relatively constant, as does the DC link voltage. Then, as shown in the fifth region (E), wherein the braking power to be dissipated ranges from about 2600 kw to about 3200 kw, another contactor (e.g., RP2) is engaged so as to activate another resistive grid (e.g., DB2). The chopper CH1 associated with DB4 does not dissipate any power in this range, while the combination of the first and second resistive grid handles the increased dissipation in this range. Accordingly, the DC link voltage is further increased as resistive grids DB1 and DB2 dissipate more power. Finally, at braking loads in excess of 3200 kw, the DB4 with chopper CH1 is once again activated to dissipate the remaining power, as shown in the sixth region (F). Since the activated resistive grids do not dissipate any additional power at this point, the DC link voltage does not increase further.

The dynamic braking scheme illustrated in FIG. 6 is particularly suitable for applications wherein it is desired to minimize the amount of contactor cycling, thereby reducing the stress on the power switching components. On the other hand, in this embodiment the DC link voltage is increased at relatively lower power dissipation levels so as to delay activating contactors and choppers until needed at higher power levels. The higher the DC link voltage, the faster the blower motors BM1, BM2 are caused to operate which, in turn, increases the amount of noise produced. In the event it is desired to minimize the amount of blower noise, another braking scheme embodiment may be implemented, as shown by the graph 700 in FIG. 7.

Figure 7:
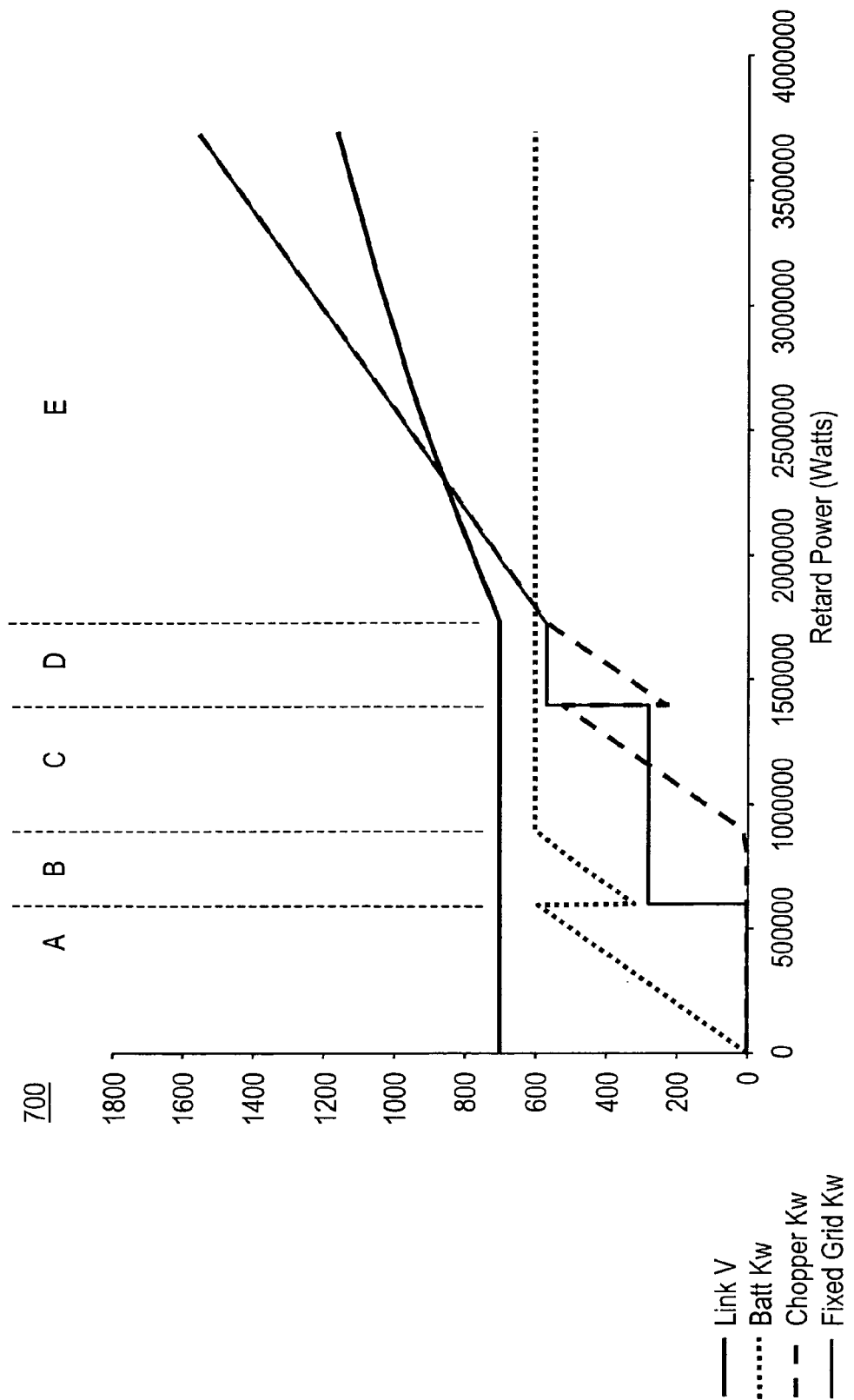
FIG. 7 illustrates a graphical display of another possible embodiment for implementing dynamic braking contactor staging control, in accordance with a further aspect of the present invention.

The first two operating regions of FIG. 7 are similar to those of FIG. 6 (i.e., only the battery dissipates braking power up to about 600 kw, and the battery and the first resistive grid DB1 collectively dissipate braking power from about 600 kw to about 900 kw). Then, in excess of 900 kw (region C), instead of allowing the first resistive grid DB1 to dissipate additional power thus increasing the DC link voltage, grid DB4 with chopper CH1 is engaged at this point to handle power dissipation. When the next operating region (D) is reached, the second resistive grid DB2 is engaged, thus decreasing the amount of power dissipated by DB4. This allows the DC link voltage to be maintained constant until about 1800 kw, where both DB4 and the first and second grid combination DB1, DB2 share the increased power dissipation task. Thus, it is only at power dissipation levels in excess of 1800 kw that the DC link voltage is increased, thereby increasing the blower motor speed. The tradeoff in this embodiment is that there is a smaller power dissipation range over which the chopper CH1 and contactors RP1, RP2 are cycled.

Another feature available with the hybrid OHV system 200 is the ability to obtain additional braking power at higher speeds. For a given DC bus voltage, a fixed resistor consumes a constant amount power. However, at the same fixed voltage the power generation capability of the traction motor is inversely proportional to the speed. Once a certain speed is reached, the power capability of the motor becomes equal to the power drawn by the resistor grids, and thus no braking operation is possible beyond that speed. On the other hand, with energy storage capability, additional power may be supplied to the grids from the storage battery so that dynamic braking operation at higher speeds is enabled. Once the maximum DC link voltage is reached, further dynamic braking is only accomplished at a lower braking horsepower.

Figure 8:
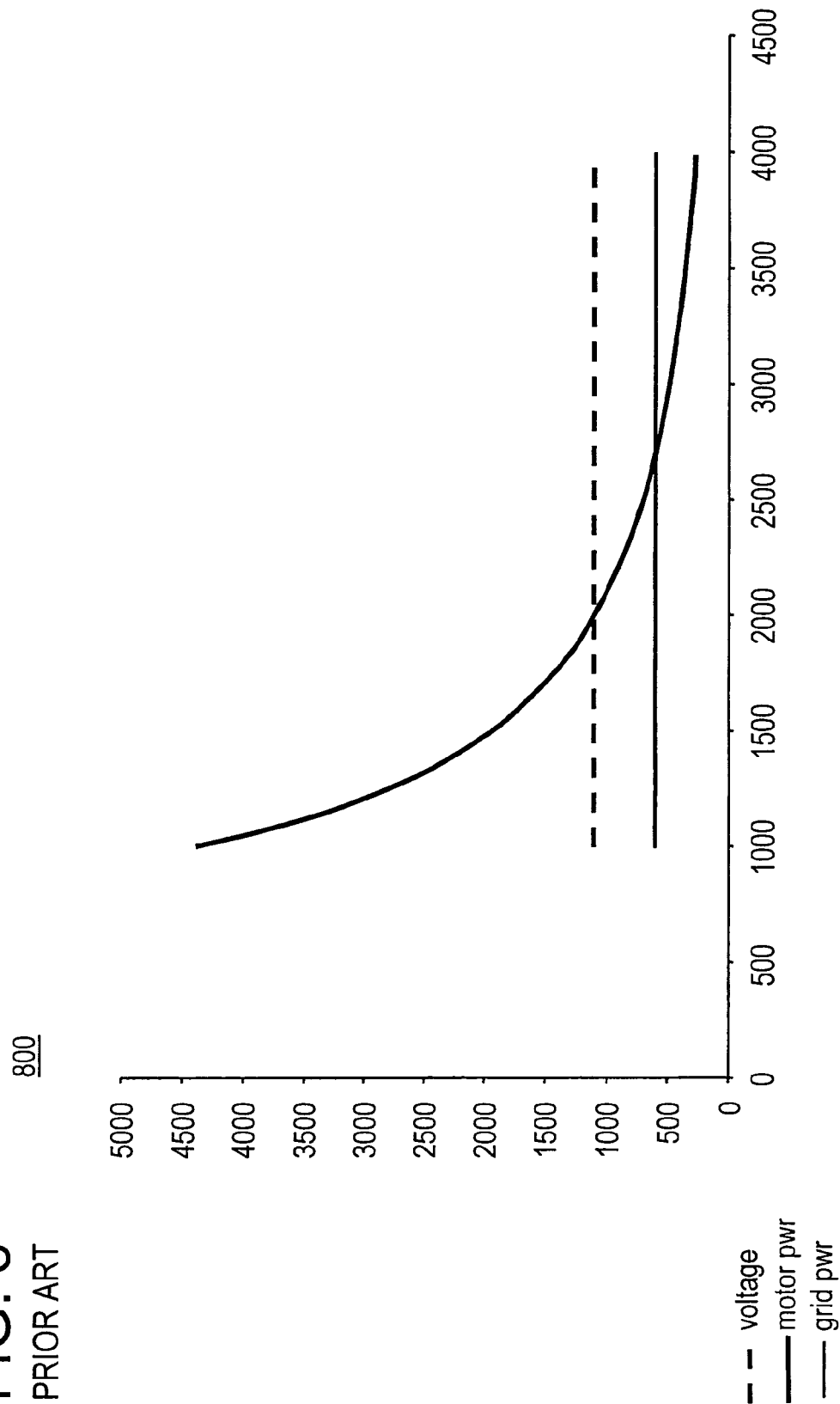
FIG. 8 is a speed versus horsepower/voltage curve for an OHV without energy storage capability.

FIG. 8 is a speed versus horsepower/voltage curve 800 for an OHV without energy storage capability. As can be seen, at a constant DC link voltage with a constant level of grid power dissipation, the point at which the decreasing traction motor output power falls below the grid power is at about 2700 rpm. At higher motor speeds, therefore, the motor is incapable of providing braking effort. However, as shown in the graph 900 of FIG. 9, the storage battery connection may be reconfigured by an applied signal to the chopper CH2 such that the battery 202 provides power to the DC bus, starting at 2700 rpm. This power could be used to increase the DC link voltage as well. The increased voltage on the DC bus has the effect of extending the speed at which the traction motor is able to provide full braking power to about 3250 rpm. Above speeds of 3250 rpm, dynamic braking is still available while the battery is supplying additional power. However, since the DC voltage has reached its maximum limit, the braking horsepower is reduced beyond that speed.

In a conventional OHV propulsion system, the engine speed is controlled by a regulator which obtains reference from the controller, based on the power command obtained from the operator. However, transient loads occur during normal operation of the vehicle auxiliaries, while variation of the propulsion loads occurs during operation over rough road conditions and potholes. Certain auxiliary transient auxiliary loads are a result of operator-induced events (e.g., power steering demands), while others occur due to the on/off control of fans and pumps, etc. Transient auxiliary loads tend to reduce the level of available traction power in conventional OHV propulsion systems.

Thus, still another novel control aspect for the hybrid OHV is to control the engine power as a function of the power demand of the traction drive, plus the average of the auxiliary power loads. As shown in the block diagram 1000 of FIG. 10, an engine control speed set point is determined via a look-up table (LUT) 1002 for the steady state engine speed that produces the required engine power (torque and speed) with minimal specific fuel consumption. Existing engines with an electronic control module (ECM) 1004 are capable of providing this function via a CAN Bus communication network. Variations in engine power set point, to either increase or decrease engine power, with the engine in operation using the engine control speed set point, are obtained by use of the torque control feature of the ECM 1004 via the CAN Bus control. This feature allows adjustment and tradeoff between the use of additional engine output power to supply transient vehicle auxiliary loads directly.

In the novel hybrid OHV case, where the transient vehicle auxiliary loads are supplied by the hybrid vehicle's batteries, the torque control feature is used to reduce the engine torque, engine power, and ultimately fuel consumption while the vehicle auxiliaries are supplied by the on-board energy storage system. The regulator 1006, using the LUT generated set point and speed signal from the OHV engine 1008, generates an appropriate error signal to control the output power of the engine 1008. Small variations in engine power (e.g., up to a certain threshold value) can be handled via the torque control feature; however, when larger perturbations occur above the threshold value, (e.g., due to grade changes in the road surface), the engine speed set point is readjusted to a different set point to optimize specific fuel consumption and emissions. It will be appreciated that although the illustrated embodiment utilizes the torque control feature of the ECM, other types of torque control may also be used.

Finally, after-treatment devices such exhaust trap filters rely on high temperatures for proper operation. At low engine power levels (e.g., during a braking operation), DC power from the DC bus or from the energy storage devices could be used to heat the catalysts. Conventional diesel or gasoline engines used in heavy-duty trucks often use catalysts to reduce the exhaust emissions. These catalysts are required to operate at relatively high temperatures, typically in the range of about 500 to about 700 Å° F. One example of such a catalyst is a regenerative particulate trap or soot filter. In conventional on-road mechanically driven trucks, the catalysts are placed in the exhaust stream and are thus heated to the required operating temperature.

Likewise, in conventional OHVs where the truck is used to haul heavy payload either into or out of a deep mine or pit, for example, the exhaust temperature may be sufficient for proper operation of the exhaust catalysts for the case while the truck is climbing the grade. However, during a downhill run wherein the vehicle has its mechanical and/or electric dynamic brakes applied while the engine is operated at relatively low power, the exhaust temperature cools and thus may not be sufficient to operate the catalysts at its required temperature. For the next uphill haul or for the high horsepower application, the catalysts have to be heated, which takes some time. Operation of the catalysts at low temperatures has a negative impact on its efficiency to reduce the exhaust emissions. Moreover, the constant cycling often contributes to a significant reduction in the useful life of the catalysts and associated components.

Therefore, in accordance with still a further aspect of the present invention, the hybrid OHV propulsion system is configured to use some of the energy that is wasted in the dynamic electric braking to heat the catalysts during downhill operation or during periods of relatively low power operation of the diesel engine. This feature is illustrated by the flow diagram 1100 of FIG. 11. When the vehicle is not in the dynamic braking mode, electrical power from the energy storage system (e.g., batteries, ultracapacitors, or flywheels) can be used to heat the catalysts to the required operating temperature for efficient operation and to achieve long life.

Thus, at decision block 1102, if output OHV engine power levels do not fall below a threshold value, no further action is taken with regard to the catalyst (as shown by return block 1104). However, if the engine power levels are below the threshold value (such as may occur during a downhill run), the process proceeds to decision block 1106 where it is determined whether the actual catalyst temperature is below the desired minimum operating temperature thereof. If not, no further action is taken at that time (block 1108). On the other hand, if the temperature is below the desired minimum operating temperature, then energy from the energy storage system will be used to heat the catalyst, as shown in block 1110.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for controlling a power system of a hybrid vehicle, the method comprising:
   determining, for a first bus voltage, a point of operation at which a power generation capability of a traction motor of the power system is equal to a power dissipation capability of one or more resistive grid elements in the power system;
   at about said point of operation, increasing first bus voltage to a second bus voltage; and
   providing power from the traction motor up to a predetermined operating speed limit of the traction motor above the said point of operation.

2. The method of claim 1, wherein said point of operation represents an operating speed of said traction motor, said first bus voltage corresponds to a first DC link voltage utilized when said traction motor is at speeds below said point of operation, and second bus voltage corresponds to a second DC link voltage utilized when said traction motor is at speeds above said point of operation.

3. The method of claim 1, wherein said increasing said first bus voltage to said second bus voltage is implemented through power from an energy device of the vehicle.

4. The method of claim 1, comprising controlling a power system of an off-highway vehicle (OHV) or a locomotive.

5. The method of claim 1, wherein the said point of operation represents predetermined constant level of grid power dissipation at the first bus voltage.

6. The method of claim 1, wherein power generation capability of the traction motor is reduced at operating speeds above the predetermined operating speed limit.

7. A method for controlling a power system of a hybrid vehicle, the method comprising:
   determining, for a first bus voltage, a point of operation at which a power generation capability of a traction motor of the power system is equal to a power dissipation capability of one or more resistive grid elements in the power system, and
   at about said point of operation, increasing said first bus voltage to a second bus voltage via power from an energy device of the vehicle; and providing power from the traction motor up to a predetermined operating speed limit of the traction motor above the said point of operation.

8. The method of claim 7, wherein the said point of operation represents predetermined constant level of grid power dissipation at the first bus voltage.

9. The method of claim 7, wherein power generation capability of the traction motor is reduced at operating speeds above the predetermined operating speed limit.

* * * * *